Patented Oct. 14, 1924.

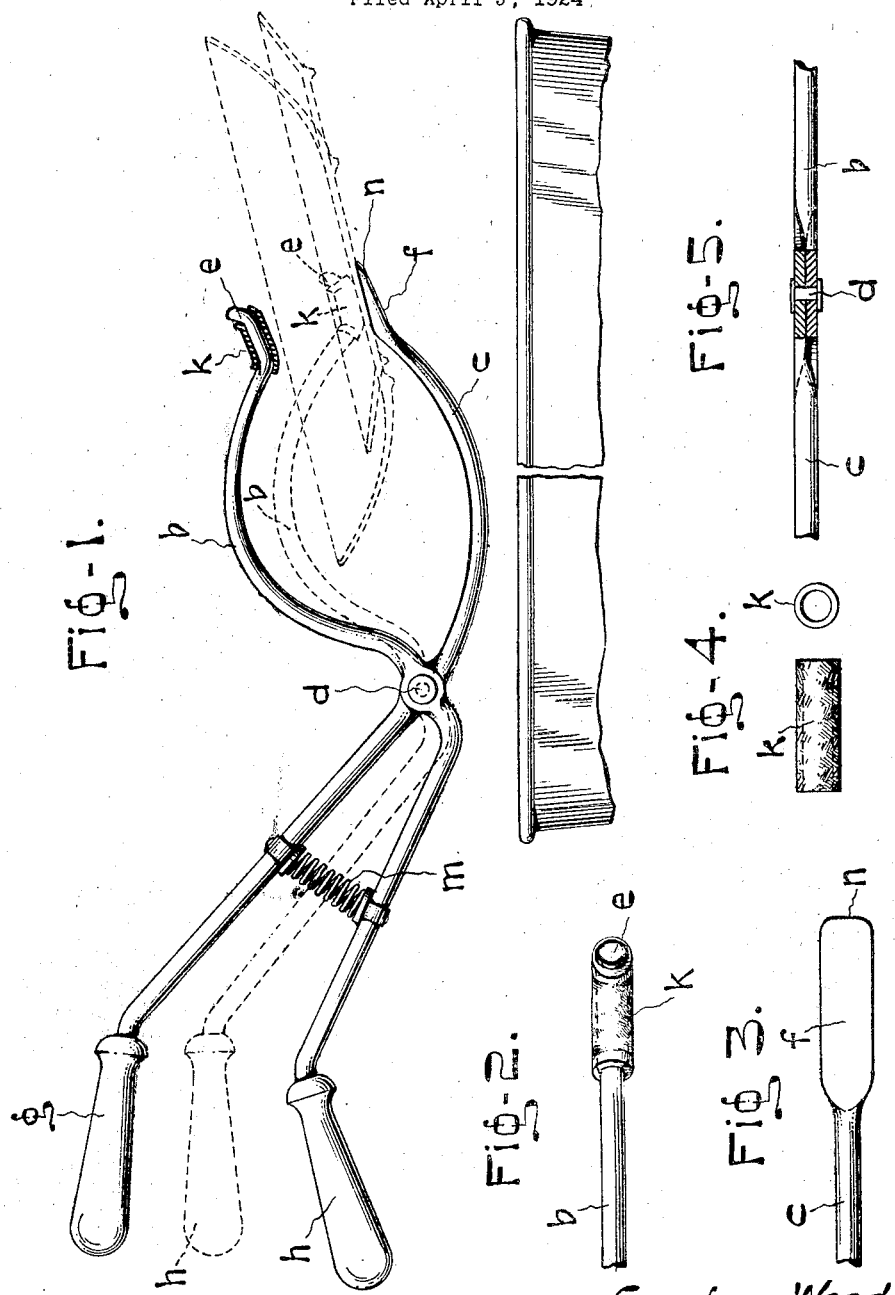

1,511,249

UNITED STATES PATENT OFFICE.

GEORGE WOOD, OF WESTMOUNT, QUEBEC, CANADA.

DISHWASHING APPLIANCE.

Application filed April 5, 1924. Serial No. 704,366.

*To all whom it may concern:*

Be it known that I, GEORGE WOOD, Westmount, Province of Quebec, Dominion of Canada, a subject of the King of Great Britain, have invented certain new and useful Improvements in Dishwashing Appliances; and I do hereby declare that the following is a full, clear, and exact description thereof.

My invention relates particularly to devices by which the dishes to be washed may be held firmly while being immersed in water prepared for cleansing purposes and adapted to hold the dishes steady while they are being scoured with a mop or the like.

The object of my invention is to provide a dish-tongs as an aid in washing dishes, which will make it unnecessary to put the hands of the operator in the water and will at once save the hands of the operator from the effects of working in water, and also allow much hotter water to be used, which will facilitate the work of cleansing and will also, by storing up heat in the dishes themselves, allow of their being stacked in a rack, to dry of their own heat, as experiment has shown that they will, to a bright polish, thus saving the time and trouble of drying, and avoiding the use of a dish towel.

It is advantageous to allow the dishes to remain two or three minutes in hot water, before commencing to clean them. Therefore, one object of my device is to enable the operator, manipulating it in one hand, to detach and seize and hold a dish from its place on the top of a pile of dishes, rested in the ordinary fashion in a dish-pan or basin, the dish being held under the water while the upper and more soiled side is being cleaned with a dish mop held in the other hand, and thereafter, by a convenient wrist movement, the dish is turned half over and held to be readily cleaned on the back (the same movement emptying the dish of water) and transferred to a rack to dry.

Seeing that the device is intended for use principally by women, and with the left hand, an object throughout is to reduce muscular effort to a minimum and to avoid sustained effort and inconvenient wrist movement or finger play altogether.

For full comprehension, however, of my invention reference must be had to the accompanying drawings in which similar reference characters indicate the same parts and wherein:

Figure 1 is a side elevation of my improved dish tongs illustrated while in use holding a dish in the act of being lifted from a dish pan;

Figure 2 is a plan view of the upper jaw of the tongs;

Figure 3 is a plan view of the lower jaw of the tongs;

Figure 4 is an elevation of a rubber nipple for encasing the end of the upper jaw; and Figure 5 is a detail sectional view of the hinged portion of the tongs.

My invention consists of a tongs of stiff wire or cast metal, comprising a pair of members $b$ and $c$ respectively hinged together as at $d$ between their ends, one end of the implement presenting a pair of co-acting gripping jaws $e$ and $f$ to serve respectively above and below the article gripped; and the other end of the implement presenting a pair of handles $g$ and $h$, the handle end of the implement being offset from the main length of the grippers end, and then bent to make the handles parallel with the main length of the grippers end as shown clearly in Figure 1. The grippers are bowed to present when closed what may be called an asymetrical ellipse while the curve of the lower gripper is flattened and its jaw is straight and flat and smooth with its forward edge of wedge form as shown in Figures 1 and 3, and extends substantially along the major axis of its elliptic form. The extremity or jaw of the upper gripper is flattened and curved away from the lower jaw as shown in Figures 1 and 2 and its angular position relatively to the lower jaw is such that it rests evenly upon the upper surface of the plate or dish gripped by it and the lower jaw. A short piece of rubber tubing $k$ is slipped over the upper jaw, in case it is desired to safeguard the pattern of a dish from being scratched, and to serve as additional precaution against slipping. A piece of string wound around this jaw will serve the same purpose. A spring $m$ connected to the handle ends normally urges the handles to a rest position in which the jaws will be about an inch apart, but allows of the gap widening or contracting by means of manual pressure. The spring also prevents the handles from opening too wide and getting out of control.

The dishes to be washed are first piled in the dish pan, and water, preferably very hot, is poured over them, (it is advantageous to allow them to remain two or three minutes in this hot water before commencing the operation). The device is held loosely in the left hand, pointing in a direction perpendicular to the direction in which the operator is facing. The jaws of the gripper are an inch or so apart, under the influence of the spring at the handles. The jaw of the lower gripper with the wedge edge n is inserted under the rim of the uppermost plate in the pile of dishes, and is pushed beneath it, till the flat upper surface of the jaw is in even contact with the bottom of top dish, inside the rim to be found on the underside of all dishes. During this manipulation the plate may be steadied by the dish-mop held in the right hand. Meantime, the curved jaw of the upper gripper slips over the edge of the dish, and by compression on the handles, the two jaws hold it firmly, enabling it to be speedily mopped. If the spot where the upper jaw is to rest, is first cleaned by the mop, it will be unnecessary to shift the grip in order to clean that spot and the under side of the jaw, but in any event the spring allows of an easy easy change of grip. The upper gripper is curved to enable dishes of various shapes to be grasped. The elliptic curve of the lower gripper is flattened to the limit required to allow clearance for the rim to be found on the underside of all dishes. The advantage of this flattening is that it allows the plate to remain nearly horizontal and supported partly by the plate next underneath, thus reducing the effort required to hold the plate and at the same time keeping it entirely under water while the upper and more soiled surface is being cleaned. The use of a curved upper gripping surface in conjunction with a flat under gripping surface, enables even contact to be made by the gripping jaws, with dishes of all thicknesses, and cups may be grasped firmly, without undue pressure, by resting the curved gripping surface against the curved inside, where it meets the bottom of the cup, or they may be grasped by the handle. The offsetting of the handle end prevents interference from the side of the dishbasin, and allows of greater length so as to give increased leverage, thus saving effort, while at the same time keeping the handles of the tongs at a level which allows convenient operation. This construction facilitates the operation by enabling such a grasp to be taken as will permit of turning the plate by a comfortable wrist movement without changing the grip, either of the plate or of the handles. The offsetting of the handle ends and the bend of the handles have the further effect of reducing the strain on the fingers in the same way as a curved smoking pipe is more easily held in the mouth than a straight pipe. The reduction in strain arises by transferring the lifting and supporting strain from the fingers and the hand, to the arm, where it can be sustained without fatigue. In the handling of 20 to 40 or more dishes by the left hand of a woman, reduction of strain and fatigue is of great importance.

When the plate is turned over towards the operator by a wrist movement, it can be rested on its edge, partly supported by the tongs, and readily cleaned, the underside usually being less soiled, and seeing that the circular rim protects the flat underside of the dish, when rested with others, it will not be necessary to change the grip in order to clean the part grasped by the lower gripper.

The dish is then lifted, dipped in a basin of water, or held under the water tap to be rinsed, and transferred to a nearby drying rack, without change of grip or change of footing by the operator. By reason of the advantageous lever, only the slightest, and hardly a noticeable pressure on the handles is needed to prevent the article from slipping while being lifted, and if, through inattention, the grasp is relaxed so as to cause slipping, the supporting rim on the under side of the dish serves as a check to prevent it from slipping from between the jaws.

The spring simplifies the operation of grasping and letting go an article, by reducing finger play, without inconveniently increasing the pressure needed to keep the jaws closed.

What I claim is as follows:—

1. A dish-washing tongs, the members of which, at the dish-grasping end, present an asymetrical ellipse, flattened on its lower side, and terminate, the lower in a narrow, flat surface, and the upper in a narrow surface, flattened and curved away from the lower member.

2. A dish-washing tongs, the members of which, at the dish-grasping end, present an asymetrical ellipse, flattened on its lower side, and terminate, the lower in a narrow, flat surface, and the upper in a narrow surface, flattened and curved away from the lower member, and bearing a protecting cover.

3. A dish-washing tongs, the members of which, at the dish-grasping end, present an asymetrical ellipse, flattened on its lower side, and terminate, the lower in a narrow, flat surface, and the upper in a narrow surface, flattened and curved away from the lower member, and bearing a removable piece of rubber tubing.

4. A dish-washing tongs the lower grasping end of which terminates in a jaw presenting a narrow, flat surface, with its forward edge of wedge form, the corresponding upper end terminating in a jaw curved away from the lower jaw.

In testimony whereof I have signed my name to this specification in the presence of two witnesses.

GEORGE WOOD.

Witnesses:
   GORDON G. COOKE,
   HARRIETTE McDONALD.